United States Patent
Hasuo

(10) Patent No.: US 10,632,628 B2
(45) Date of Patent: Apr. 28, 2020

(54) ROBOT

(71) Applicant: Fanuc Corporation, Yamanashi (JP)

(72) Inventor: Takeshi Hasuo, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/217,993

(22) Filed: Dec. 12, 2018

(65) Prior Publication Data

US 2019/0193286 A1    Jun. 27, 2019

(30) Foreign Application Priority Data

Dec. 22, 2017 (JP) ................. 2017-245789

(51) Int. Cl.
| | |
|---|---|
| *B25J 18/00* | (2006.01) |
| *B25J 19/00* | (2006.01) |
| *B25J 17/00* | (2006.01) |
| *B25J 9/10* | (2006.01) |

(Continued)

(52) U.S. Cl.
CPC ........... *B25J 18/007* (2013.01); *B25J 9/0009* (2013.01); *B25J 9/102* (2013.01); *B25J 17/00* (2013.01); *B25J 17/0258* (2013.01); *B25J 19/0066* (2013.01)

(58) Field of Classification Search
CPC ........ B25J 18/007; B25J 9/0009; B25J 9/102; B25J 17/0258
See application file for complete search history.

(56) References Cited

U.S. PATENT DOCUMENTS 4,624,621 A * 11/1986 Murakami ................. B25J 9/06
414/735
4,973,215 A * 11/1990 Karlen ....................... B25J 9/04
414/729

(Continued)

FOREIGN PATENT DOCUMENTS

| EP | 0092247 A2 | 10/1983 |
|---|---|---|
| JP | S58-181586 A | 10/1983 |

(Continued)

OTHER PUBLICATIONS

Sadamitsu, Daiki; Decision to Grant a Patent; Japanese Patent Application No. 2017-245789; Nov. 12, 2019; 3 pages.

(Continued)

*Primary Examiner* — David M Fenstermacher
(74) *Attorney, Agent, or Firm* — Winstead PC

(57) ABSTRACT

A robot includes one or more joints. At least the one joint includes: a first joint member and a second joint member disposed so as to be relatively rotatable around a predetermined axis; a reducer that relatively rotatably supports the first and second joint members around the axis on one side in a direction of the axis of the first joint member; and a bearing that supports the first and second joint members relatively rotatably around the axis and relatively movable in a direction along the axis on another side in the direction of the axis of the first joint member, the first and second joint members include respective flange surfaces perpendicular to the axis and facing each other in the direction of the axis, and each of the flange surfaces includes a screw hole or a through hole for closely adhering the flange surfaces by fastening of a bolt.

3 Claims, 7 Drawing Sheets

(51) Int. Cl.
*B25J 9/00* (2006.01)
*B25J 17/02* (2006.01)

(56) References Cited

U.S. PATENT DOCUMENTS

| | | | | |
|---|---|---|---|---|
| 5,203,748 | A * | 4/1993 | Sawada | B25J 9/102 |
| | | | | 475/183 |
| 5,823,061 | A | 10/1998 | Tomiyasu | |
| 6,314,826 | B1 * | 11/2001 | Cunningham | F16H 25/06 |
| | | | | 475/168 |
| 7,409,891 | B2 * | 8/2008 | Takemura | F16H 49/001 |
| | | | | 74/640 |
| 7,513,173 | B2 * | 4/2009 | Ono | B25J 9/1065 |
| | | | | 414/917 |
| 8,117,945 | B2 * | 2/2012 | Nakamura | F16H 1/32 |
| | | | | 475/163 |
| 8,210,069 | B2 * | 7/2012 | Chen | B25J 17/0258 |
| | | | | 74/490.01 |
| 8,464,413 | B1 | 6/2013 | Prater et al. | |
| 8,616,086 | B2 * | 12/2013 | Hirai | B25J 9/1025 |
| | | | | 74/640 |
| 8,757,029 | B2 * | 6/2014 | Negishi | B25J 9/1025 |
| | | | | 74/411 |
| 2015/0246450 | A1 | 9/2015 | Yoneda | |
| 2016/0288321 | A1 | 10/2016 | Adachi et al. | |
| 2017/0312924 | A1 | 11/2017 | Kinoshita et al. | |

FOREIGN PATENT DOCUMENTS

| | | |
|---|---|---|
| JP | S64-056987 U | 4/1989 |
| JP | H02-059281 A | 2/1990 |
| JP | H04-070486 U | 6/1992 |
| JP | H05-029693 U | 4/1993 |
| JP | H09-109082 A | 4/1997 |
| JP | H09-150389 A | 6/1997 |
| JP | H09-295288 A | 11/1997 |
| JP | 2009-050971 A | 3/2009 |
| JP | 2015-163414 A | 9/2015 |
| JP | 2016-196054 A | 11/2016 |
| JP | 2017-196720 A | 11/2017 |
| JP | 2018-187711 A | 11/2018 |

OTHER PUBLICATIONS

Airi; Search Report by Registered Search Organization; Japanese Patent Application No. 2017-245789; dated Oct. 30, 2019; 6 pages.

* cited by examiner

ROBOT

CROSS-REFERENCE TO RELATED APPLICATIONS

This application is based on Japanese Patent Application No. 2017-245789, the content of which is incorporated herein by reference.

TECHNICAL FIELD

The present invention relates to a robot.

BACKGROUND ART

There is known a robot supported by a double-supported structure in which two members are supported by a reducer and a bearing disposed on both sides in the rotation axial direction of the two members coupled by a joint, for the purpose of enhancing rigidity of the joint (for example, refer to PTL 1).

CITATION LIST

Patent Literature

{PTL 1} Japanese Unexamined Utility Model Application, Publication No. 5-29693

SUMMARY OF INVENTION

An aspect of the present invention is directed to a robot including one or more joints, wherein at least the one joint includes: a first joint member and a second joint member disposed so as to be relatively rotatable around a predetermined axis; a reducer that relatively rotatably supports the first joint member and the second joint member around the axis on one side in a direction of the axis of the first joint member; and a bearing that supports the first joint member and the second joint member relatively rotatably around the axis and relatively movably in a direction along the axis on another side in the direction of the axis of the first joint member, the first joint member and the second joint member include respective flange surfaces perpendicular to the axis and facing each other in the direction of the axis, and each of the flange surfaces includes a screw hole or a through hole for closely adhering the flange surfaces by fastening of a bolt.

DESCRIPTION OF EMBODIMENTS

A robot 1 according to an embodiment of the present invention will be hereinafter described with reference to the drawings.

Figure 1:
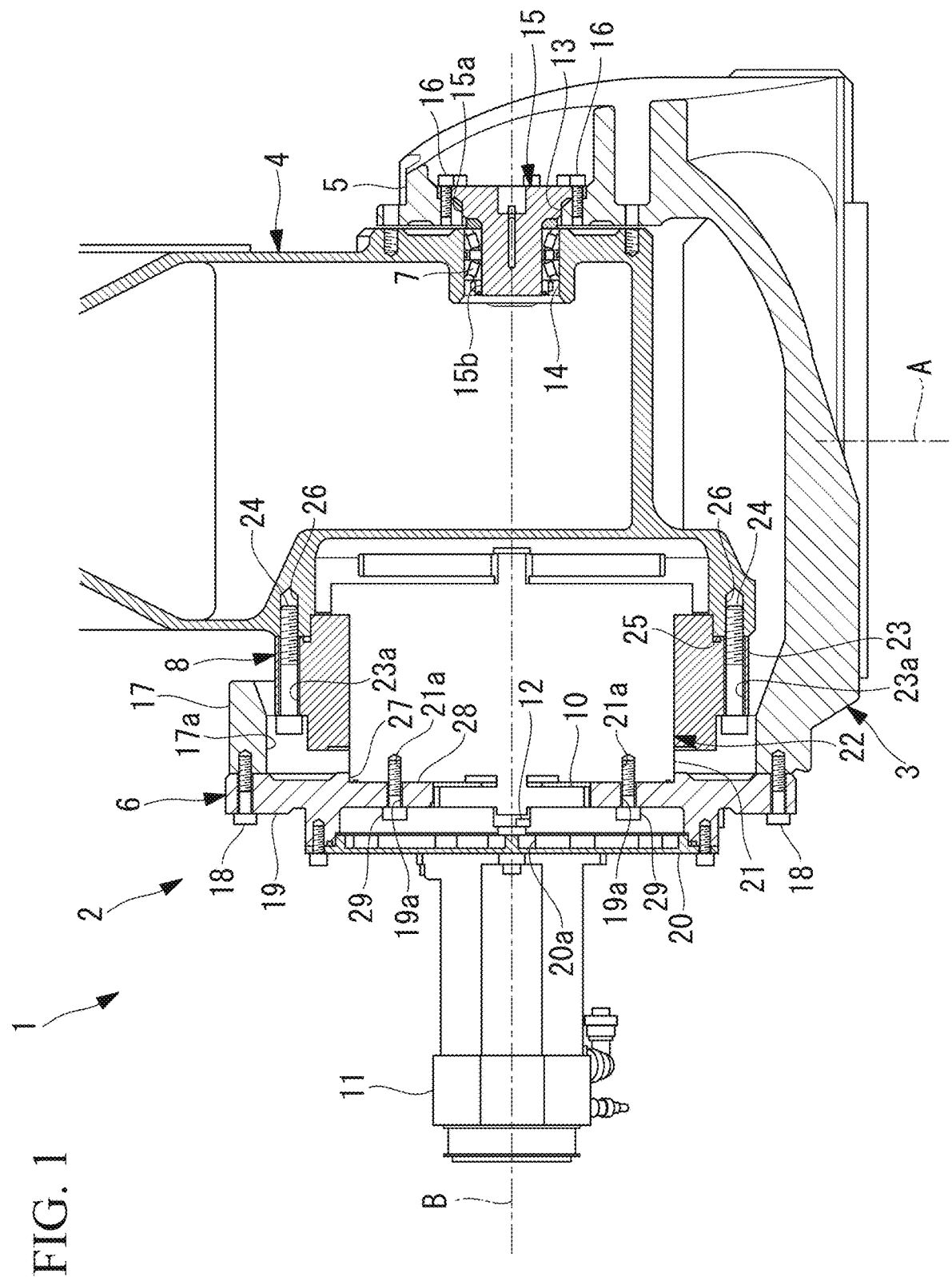
FIG. 1 is a partially longitudinal sectional view illustrating a robot according to an embodiment of the present invention.

The robot 1 according to this embodiment is, for example, a vertical articulated type robot including a plurality of joints 2. The one joint 2 of this robot 1 includes a revolving drum (first joint member) 3 that is rotated around a vertical axis A, and an arm (second joint member) 4 that is rotated around a horizontal axis (axis) B with respect to the revolving drum 3, as illustrated in FIG. 1, for example.

The revolving drum 3 includes two support parts 5, 6 disposed on both sides in the horizontal axis B direction with respect to the arm 4. The first support part 5 of the revolving drum 3, and the arm 4 are rotatably coupled around the horizontal axis B by a bearing 7. The second support part 6 of the revolving drum 3, and the arm 4 are rotatably coupled around the horizontal axis B by a reducer 8. Consequently, the arm 4 is rotatably supported around the horizontal axis B with a double-supported structure with respect to the revolving drum 3.

A drive gear 12 of a motor 11 meshes with an input gear 10 provided in an input shaft 22 described below of the reducer 8. Rotation of the motor 11 is transmitted from the drive gear 12 to the input gear 10, and the speed of the rotation is reduced by the reducer 8, and the rotation is transmitted to the arm 4. Consequently, torque of the motor 11 is amplified in accordance with a reduction ratio of the reducer 8, and the arm 4 can be rotationally driven around the horizontal axis B with respect to the revolving drum 3 by large torque.

The first support part 5 of the revolving drum 3 is provided with a first fitting hole 13 that penetrates along the horizontal axis B. Additionally, the arm 4 is provided with a second fitting hole 14 that is disposed coaxially with the first fitting hole 13, and is fitted to an outer ring of the bearing 7. A shaft 15 penetrates to be inserted into the first fitting hole 13 and the second fitting hole 14. The shaft 15 includes a large-diameter part 15a fitted in the first fitting hole 13, and a small-diameter part 15b fitted in an inner ring of the bearing 7, and is fixed to the support part 5 of the revolving drum 3 by a bolt 16.

Consequently, the arm 4 is rotatably supported around the horizontal axis B with respect to the revolving drum 3 by the bearing 7 disposed between the small-diameter part 15b of the shaft 15 having the large-diameter part 15a fitted in the first fitting hole 13 of the revolving drum 3, and the second fitting hole 14. Additionally, a fitting position of the outer ring of the bearing 7, and the second fitting hole 14 is shifted in the horizontal axis B direction, so that the arm 4 is movably supported in the direction along the horizontal axis B with respect to the revolving drum 3.

The second support part 6 of the revolving drum 3 includes an annular part 17 having an inner hole 17a which is large enough to allow the reducer 8 to pass in the horizontal axis B direction, a disk shaped reducer bracket 19 fixed to the annular part 17 by a bolt 18 at a position where the inner hole 17a of the annular part 17 is blocked from the outside in the horizontal axis B direction, and a motor bracket 20 for fixing the motor 11 to the reducer bracket 19.

In this embodiment, the reducer 8 is, for example, a planetary gear reducer, and a system of rotationally driving an external annular output shaft 23 with respect to the input shaft 22 having a columnar inner casing 21. A plurality of through holes 23*a* for allowing bolts 24 to penetrate is provided parallel to a center line of the output shaft 23 in the output shaft 23.

The arm 4 is provided with a flange surface 25 for closely adhering the output shaft 23 of the reducer 8 in the horizontal axis B direction. The bolts 24 which penetrate the through holes 23*a* of the reducer 8 are fastened to screw holes 26 provided in the flange surface 25, so that the output shaft 23 of the reducer 8 is fixed to the arm 4.

The reducer bracket 19 includes a fitting surface 27 having a shape of a cylindrical inner surface, the fitting surface 27 for fitting an outer peripheral surface (surface to be fitted) of a columnar casing 21 of the input shaft 22 of the reducer 8. Additionally, the reducer bracket 19 includes a fixed surface 28 for closely adhering an end surface in the horizontal axis B direction of the columnar casing 21 in a state in which the outer peripheral surface is fitted to the fitting surface 27.

The fixed surface 28 includes a plurality of through holes 19*a* for penetrating bolts 29.

Screw holes 21*a* are provided at positions corresponding to the through holes 19*a* of the fixed surface 28 in the end surface of the casing 21 of the reducer 8. The bolts 29 that penetrate the through holes 19*a* of the fixed surface 28 of the reducer bracket 19 are fastened to the screw holes 21*a* provided in the end surface, so that the reducer bracket 19 can be firmly fixed to the input shaft 22 of the reducer 8.

The motor bracket 20 includes a through hole 20*a* for penetrating a motor shaft, and the drive gear 12 is a planar member for fixing the motor 11 to the reducer bracket 19 in a positioning state such that the drive gear 12 meshes with the input gear 10.

Figure 2:
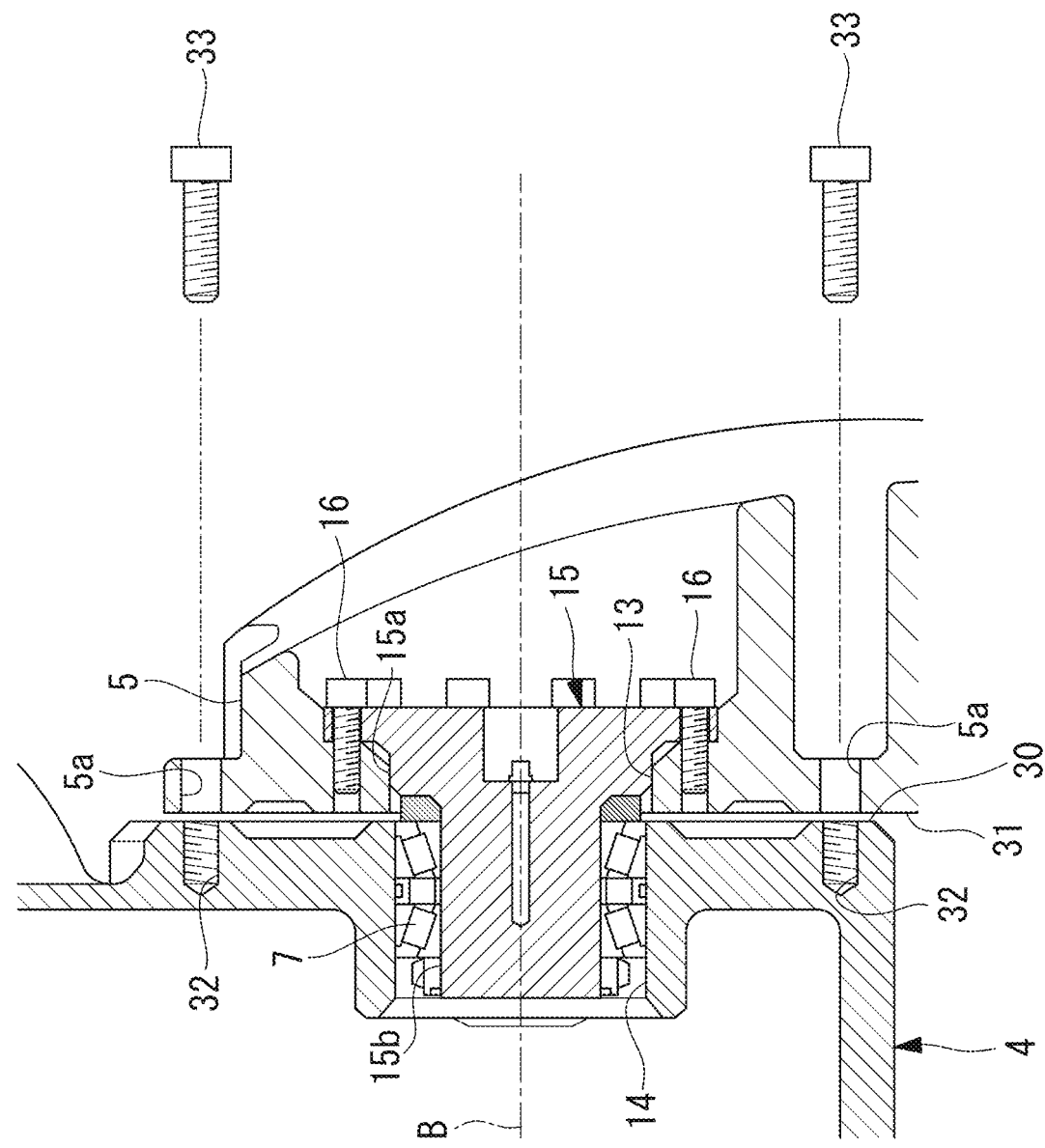
FIG. 2 is an enlarged longitudinal sectional view illustrating a bearing portion of a joint of the robot of FIG. 1.

In the robot 1 according to this embodiment, as illustrated in FIG. 2, flange surfaces 30, 31 that extend in the direction perpendicular to the horizontal axis B, and face each other in the horizontal axis B direction are provided in the first support part 5 which couples the arm 4 to the revolving drum 3 by the bearing 7, and the arm 4, respectively.

In the flange surface 31 provided in the first support part 5, a plurality of through holes 5*a* provided in parallel to an axis of the first fitting hole 13 at an interval in the circumferential direction are provided in the radially outward direction of the first fitting hole 13 for fitting the large-diameter part 15*a* of the shaft 15. In the flange surface 30 of the arm 4, a plurality of screw holes 32 disposed at positions corresponding to the through holes 5*a* when facing the flange surface 31 of the support part 5 are provided.

These through holes 5*a* and screw holes 32 are used when the robot 1 is assembled, or in maintenance work in which the robot 1 is disassembled.

Working of the robot 1 thus configured according to this embodiment will be hereinafter described.

Figure 3:
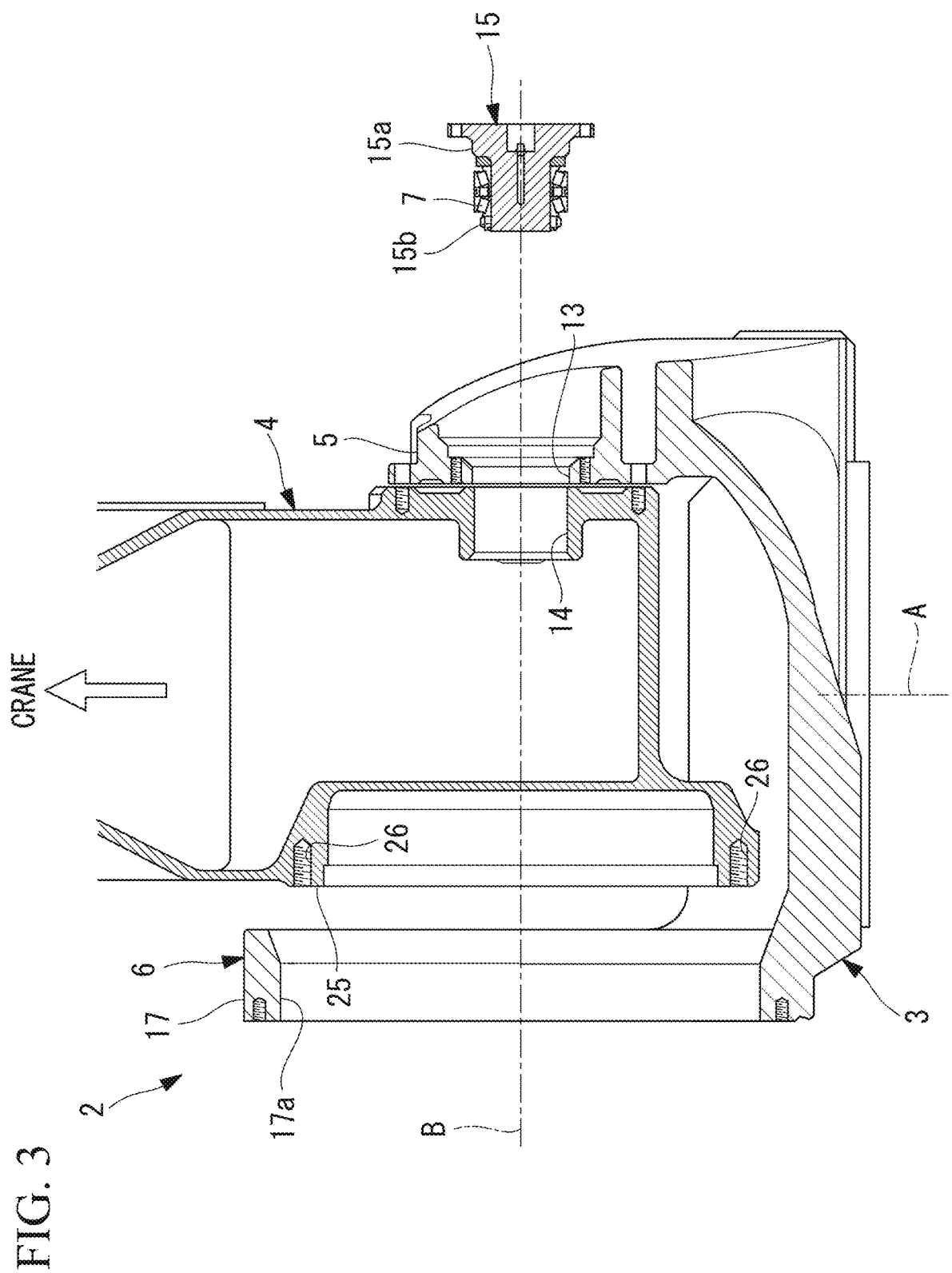
FIG. 3 is a partially longitudinal sectional view illustrating a state in which an arm is hoisted to be positioned with respect to a revolving drum constituting the joint of the robot of FIG. 1.

When the robot 1 according to this embodiment is assembled, the arm 4 hoisted by a crane is first moved with respect to the fixed revolving drum 3, and is disposed at a position where an axis of the arm 4 coincides with the horizontal axis B of the revolving drum 3, as illustrated in FIG. 3.

The shaft 15 having the small-diameter part 15*b* fitted and fixed to the inner ring of the bearing 7 is fitted in the first fitting hole 13 of the revolving drum 3 and the second fitting hole 14 of the arm 4 from the outside of the first support part 5 of the revolving drum 3. The large-diameter part 15*a* of the shaft 15 is fitted in the first fitting hole 13 of the support part 5, the outer ring of the bearing 7 mounted on the small-diameter part 15*b* of the shaft 15 is fitted in the second fitting hole 14 of the arm 4, and the shaft 15 is fixed to the support part 5 by the bolt 16.

Consequently, the arm 4 is relatively rotatably supported around the horizontal axis B to the revolving drum 3 by the bearing 7, and the fitting position of the outer ring of the bearing 7 to the second fitting hole 14 is changed, so that the arm 4 can be slightly moved in the direction along the horizontal axis B with respect to the revolving drum 3.

Figure 4:
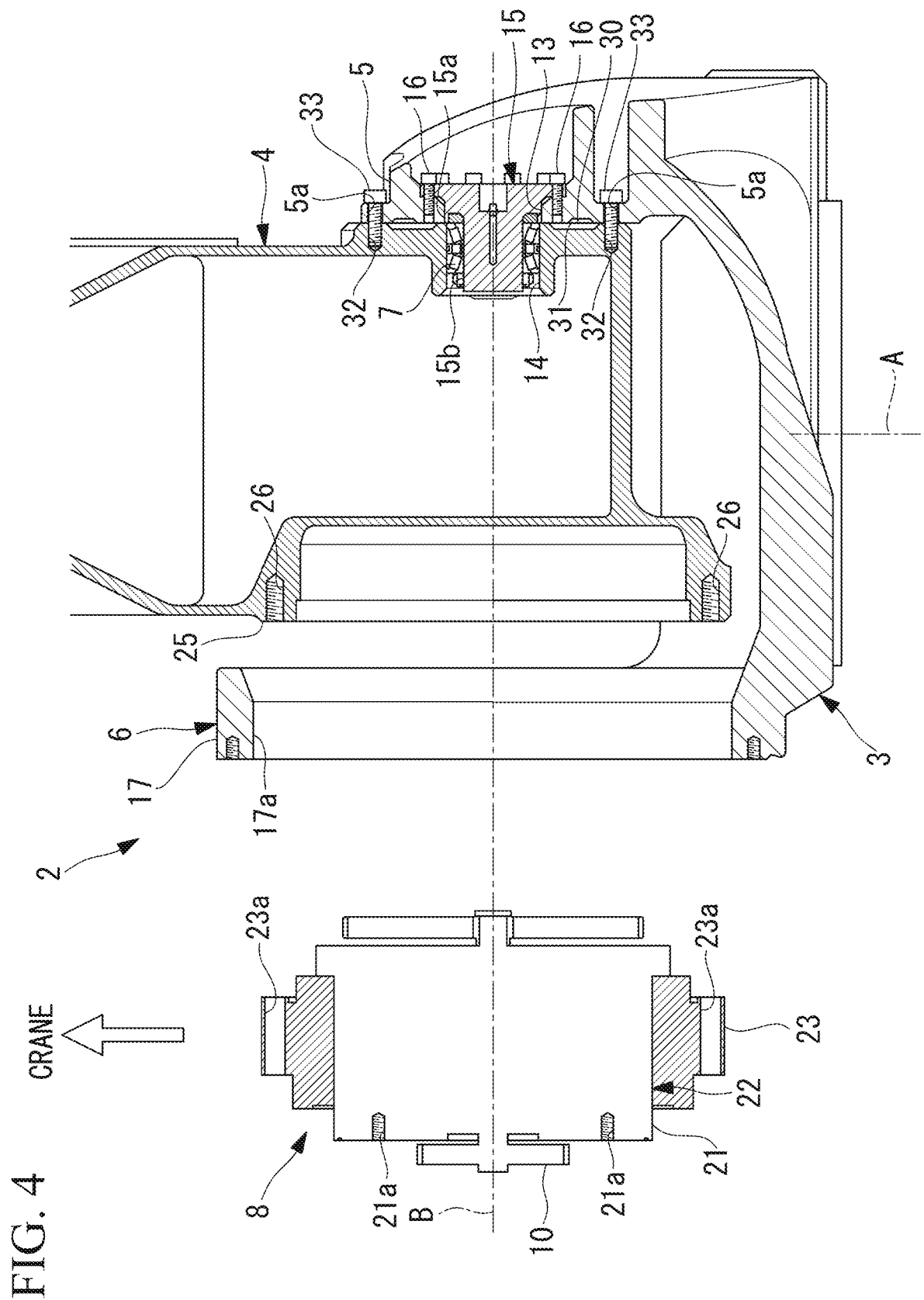
FIG. 4 is a partially longitudinal sectional view illustrating a state in which a bearing is fitted to the arm of FIG. 3, and the arm and the revolving drum are fixed by bolts.

As illustrated in FIGS. 2 and 4, bolts 33 penetrate the through holes 5*a* provided in the flange surface 31 of the support part 5, and are fastened to the screw holes 32 provided in the flange surface 30 of the arm 4. Consequently, the flange surface 30 of the arm 4 is pulled and closely adhered to the flange surface 31 of the support part 5 by fastening power of the bolts 33. That is, the flange surfaces 30, 31 are closely adhered to each other, so that the arm 4 is fixed so as not to rotate around the horizontal axis B with respect to the revolving drum 3 and so as not to move in the direction along the horizontal axis B by friction generated between the flange surfaces 30, 31.

That is, in this state, even when the crane that hoists the arm 4 is detached, the arm 4 is maintained in a state of being fixed to the revolving drum 3. Therefore, the crane is hooked from the arm 4 onto the reducer 8, and, as illustrated in FIG. 4, the reducer 8 can be hoisted. Then, the hoisted reducer 8 passes through the inner hole 17*a* of the annular part 17 from the second support part 6 side to be displaced in a state in which the center line of the input shaft 22 coincides with the horizontal axis B, and the bolts 24 that pass through the through holes 23*a* of the output shaft 23 are fastened to the screw holes 26 provided in the flange surface 25 of the arm 4, so that as illustrated in FIG. 5, the reducer 8 is fixed to the arm 4.

Figure 5:
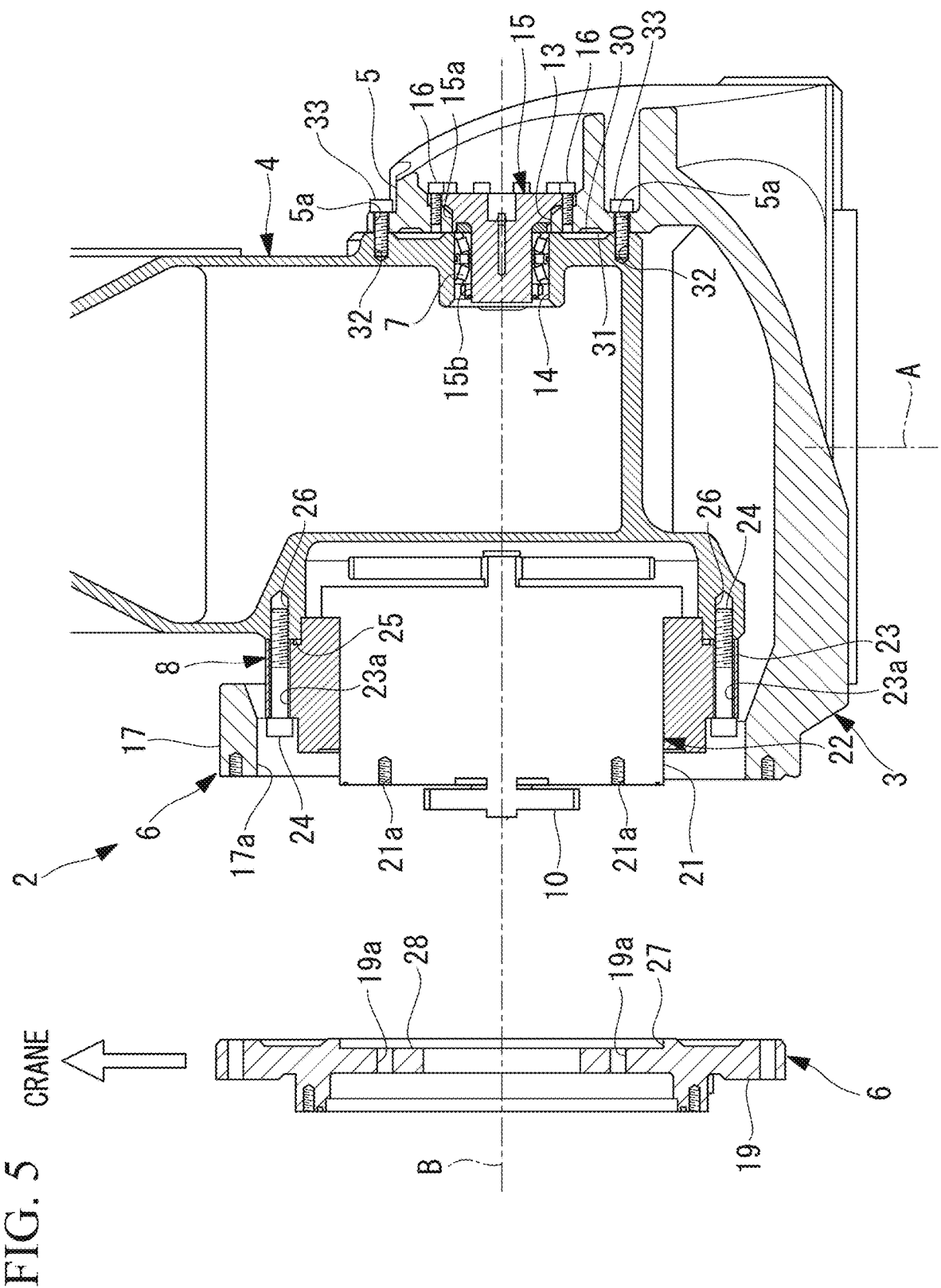
FIG. 5 is a partially longitudinal sectional view illustrating a state in which a reducer is fixed to the arm of FIG. 4.

Next, the crane that hoists the reducer 8 is hooked onto the reducer bracket 19, and as illustrated in FIG. 5, the reducer bracket 19 can be hoisted. Then, while the outer peripheral surface of the casing 21 of the input shaft 22 of the reducer 8 is fitted to the fitting surface 27 of the hoisted reducer bracket 19, fixing to the annular part 17 of the support part 6 by the bolt 18 is performed.

The crane is hooked from the reducer bracket 19 onto the arm 4 again, and in a state in which the arm 4 is hoisted, the bolts 33 that closely adhere the flange surfaces 30, 31 are detached, and the bolts 29 that pass through the through holes 19*a* of the reducer bracket 19 are fastened to the screw holes 21*a* provided in the end surface of the casing 21 of the reducer 8. Consequently, the reducer 8 is pulled toward the reducer bracket 19 in the direction along the horizontal axis B by fastening power of the bolts 29, the fitting state of the fitting surface 27 of the outer peripheral surface of the casing 21 is deepened, and the end surface of the input shaft 22 of the reducer 8 can be closely adhered and firmly fixed to the fixed surface 28 of the reducer bracket 19.

The reducer 8 is moved toward the reducer bracket 19, so that a suitable gap is formed between the flange surface 30 of the arm 4 and the flange surface 31 of the support part 5, and contact between each other at the time of rotation of the arm 4 with respect to the revolving drum 3 is prevented.

Figure 6:
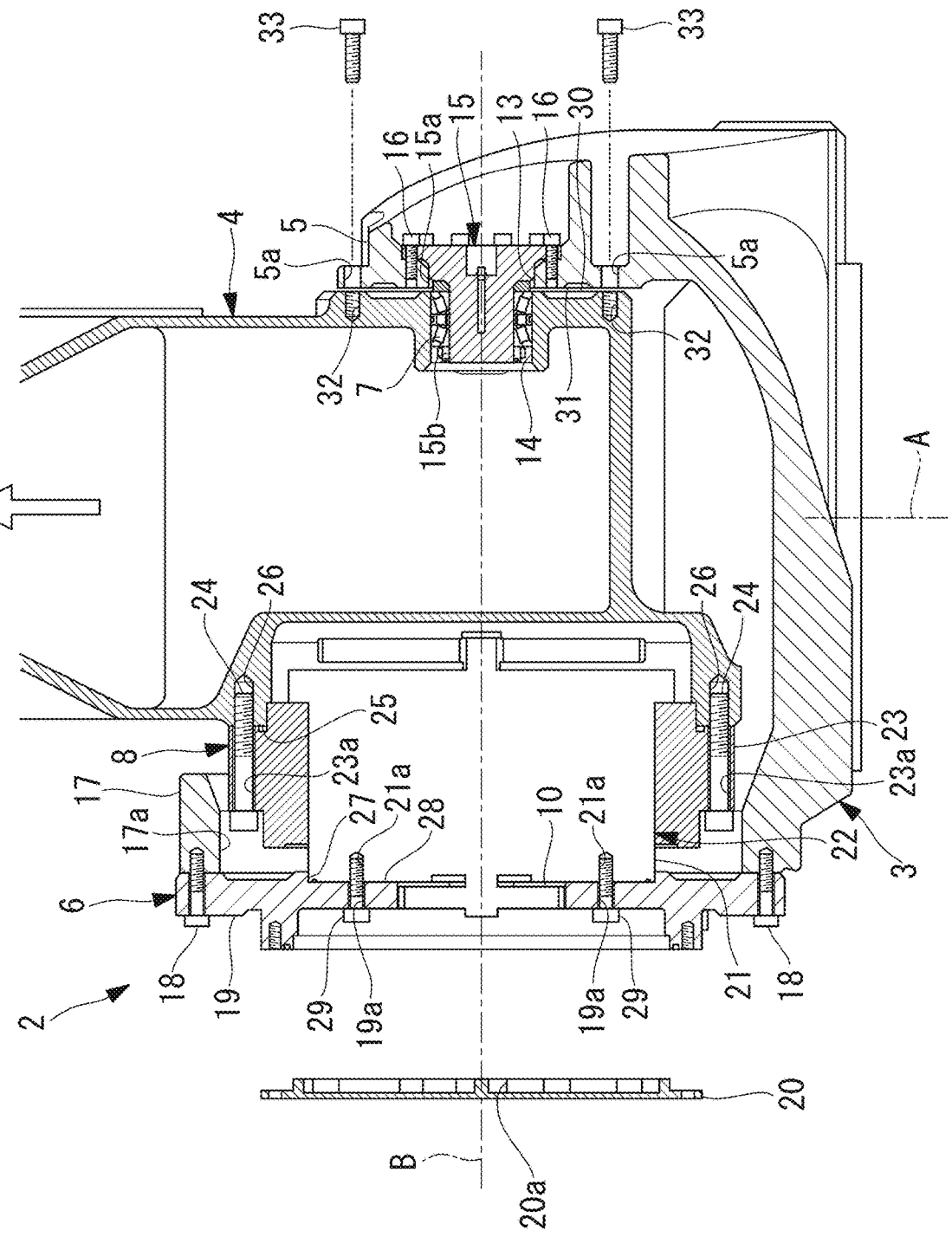
FIG. 6 is a partially longitudinal sectional view illustrating a state in which the reducer of FIG. 5 is fixed to the revolving drum, and the bolts that fix the arm and the revolving drum are removed.
Figure 7:
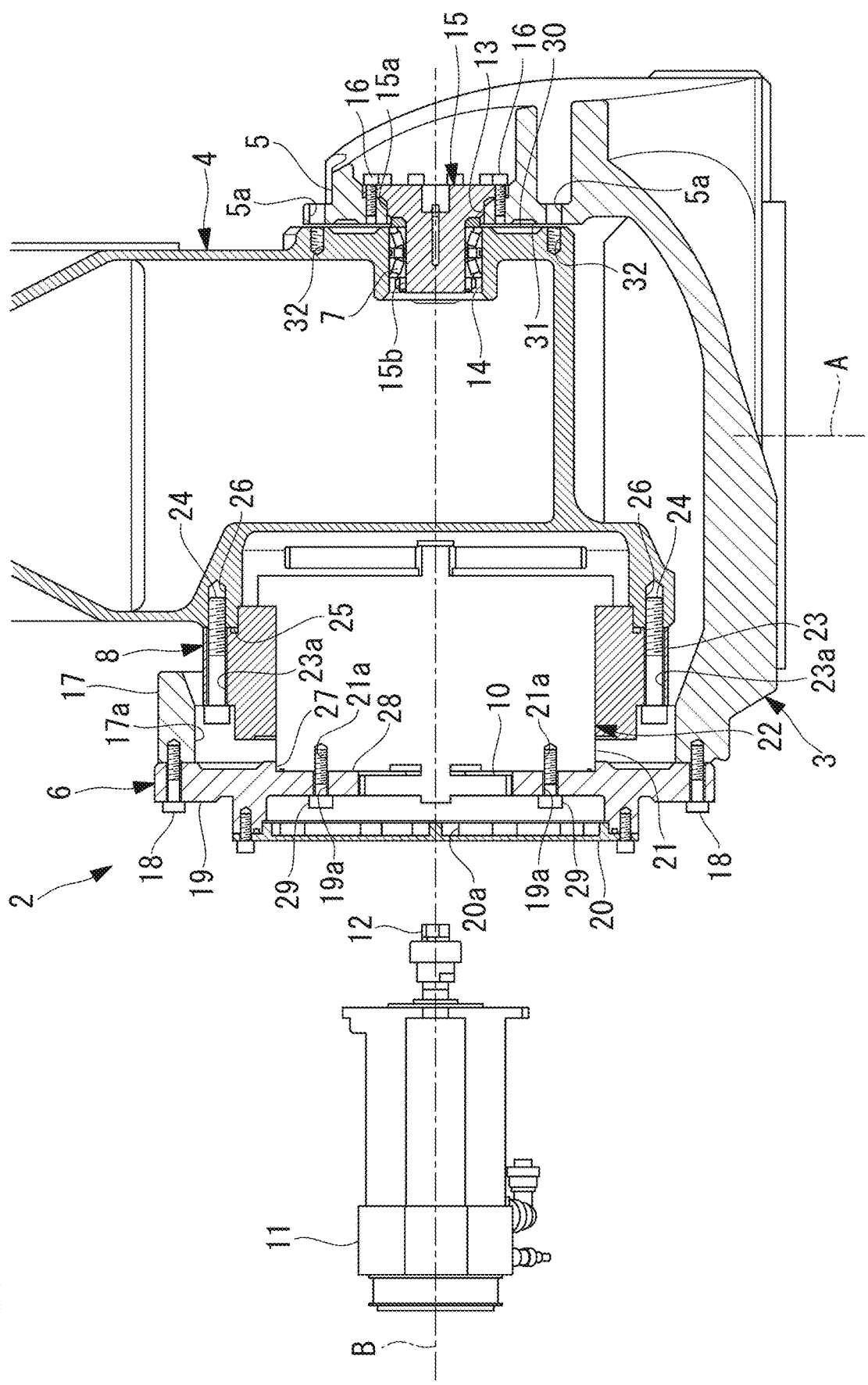
FIG. 7 is a partially longitudinal sectional view illustrating a state in which a motor is mounted on a joint of FIG. 6.

Thereafter, as illustrated in FIG. 6, the motor bracket 20 is mounted on the reducer bracket 19, and as illustrated in FIG. 7, while the drive gear 12 of the motor 11 meshes with the input gear 10 of the reducer 8, the motor 11 is fixed to the motor bracket 20.

Consequently, even when assembly of the joints 2 of the robot 1 is finished, and the hoisting state of the crane that hoists the arm 4 is released, rotation of the arm 4 around the horizontal axis B is regulated by a brake provided in the motor 11.

Here, the motor bracket 20 and the motor 11 are relatively lightweight, and therefore hoisting by the crane is unnecessary, or assembly can be performed by other simple hoisting method.

Thus, according to the robot 1 of this embodiment, when the joint 2 including the revolving drum 3 and the arm 4 is assembled, the flange surfaces 30, 31 are closely adhered by the bolts 33, and the arm 4 can be fixed to the revolving drum 3. Therefore, the crane that hoists the arm 4 is sequentially hooked onto heavy goods such as the reducer 8 and the reducer bracket 19 in place of the arm 4, so that it is possible to assemble the joint. As a result, even under environment where only a single crane is provided, assembly work, maintenance work, or the like can be advantageously performed.

In a case where the robot 1 according to this embodiment is disassembled in order to, for example, maintain the robot, the disassembling can be performed by a procedure reverse to the above.

That is, as illustrated in FIG. 6, in a state in which the arm 4 is hoisted, the motor 11 is detached, and the motor bracket 20 is detached.

Next, the bolts 29 fixing the reducer bracket 19 and the reducer 8 are loosened, the bolts 33 that penetrate the through holes 5a provided in the first support part 5 are fastened to the screw holes 32 provided in the flange surface 30 of the arm 4. Consequently, flange surfaces 30, 31 of the revolving drum 3 and the arm 4 are closely adhered to each other, and the arm 4 is fixed to the revolving drum 3.

The crane that hoists the arm 4 is hooked onto the reducer bracket 19 again, the bolt 18 that fixes the reducer bracket 19 to the annular part 17 of the revolving drum 3 is loosened, and the reducer bracket 19 is detached.

Then, the crane that hoists the reducer bracket 19 is hooked onto the reducer 8 again, the bolts 24 that fix the reducer 8 to the arm 4 are loosened, and the reducer 8 is detached.

Consequently, even under environment where only a single crane can be used, it is possible to facilitate replacement of the reducer 8.

Furthermore, in a case of disassembling, the crane that hoists the reducer 8 is hooked onto the arm 4 again from this state, and the bolts 33 that closely adhere the flange surfaces 30, 31 are detached in a state in which the arm 4 is hoisted. Then, the bolt 16 that fixes the shaft 15 to the revolving drum 3 is loosened, and the shaft 15 and the bearing 7 are pulled out of the arm 4, so that the revolving drum 3 and the arm 4 can be separated.

In this embodiment, the joint including the revolving drum 3 and the arm 4 is exemplified as the joint 2 of the robot 1. However other joint may be applied in place of this.

Additionally, the casing 21 of the input shaft 22 of the reducer 8 is columnar, and the outer peripheral surface is fitted to the fitting surface 27 having a shape of the cylindrical inner surface of the reducer bracket 19. However, both the outer peripheral surface and the fitting surface 27 may be movably positioned by pins to be fitted in pin holes provided in both the outer peripheral surface and the fitting surface 27.

The output shaft 23 composed of an annular member is provided in the radially outward direction of the input shaft 22 composed of the columnar casing 21 of the planetary gear reducer. Therefore, the casing 21 is fixed to the reducer bracket 19 fixed to the annular part 17 of the second support part 6 of the revolving drum 3, and the annular output shaft part 23 is fixed to the arm 4. However, on the contrary, the columnar casing 21 may be used as the output shaft 23, and the input shaft 22 may be used as the annular member in the radially outward direction of the casing 21.

In this case, in the above embodiment, the outer peripheral surface of the casing 21 is fitted to the fitting surface 27 having a shape of the cylindrical inner surface of the reducer bracket 19. However, a cylindrical surface to be fitted may be provided in the annular output shaft 23, and may be fitted to a cylindrical inner surface (fitting surface) provided in the annular part 17 of the second support part 6. Consequently, the reducer bracket 19 may be eliminated.

The screw holes 32 are provided in the flange surface 30 provided in the arm 4. However, in place of this, the through holes may be provided, the flange surfaces 30, 31 may be closely adhered to each other by the bolts 33 and nuts.

As a result, the above-described embodiment leads to the following aspect.

An aspect of the present invention is directed to a robot including one or more joints, wherein at least the one joint includes: a first joint member and a second joint member disposed so as to be relatively rotatable around a predetermined axis; a reducer that relatively rotatably supports the first joint member and the second joint member around the axis on one side in a direction of the axis of the first joint member; and a bearing that supports the first joint member and the second joint member relatively rotatably around the axis and relatively movably in a direction along the axis on another side in the direction of the axis of the first joint member, the first joint member and the second joint member include respective flange surfaces perpendicular to the axis and facing each other in the direction of the axis, and each of the flange surfaces includes a screw hole or a through hole for closely adhering the flange surfaces by fastening of a bolt.

When the robot according to this aspect is assembled, in a state in which the respective axes of the first joint member and the second joint member coincide with each other, the first joint member and the second joint member are coupled by the reducer on the one side in the direction of the axis of the first joint member, and the bearing on another side. Consequently, the second joint member is supported with respect to the first joint member by the double-supported structure.

In this case, the first joint member is fixed, the second joint member is hoisted by a crane, the axes of the first joint member and the second joint member coincide with each other, and both the joint members are first coupled by the bearing. Consequently, the first joint member and the second joint member are coaxially positioned by the bearing, supported so as to be relatively rotatable around the axis, and supported so as to be relatively movable in the direction along the axis.

In this state, the first joint member and the second joint member are relatively moved in the direction along the axis, and the flange surfaces of both the joint members are brought close to each other, and the flange surfaces are closely adhered by the fastening of the bolt by use of the screw holes or the through holes provided in the flange surfaces. Consequently, the second joint member is fixed to the first joint member by friction between the flange surfaces, and it is possible to prohibit relative rotation and relative movement of both the joint members.

Next, the crane that hoists the second joint member is detached from the second joint member, and is hooked onto the reducer to hoist the reducer. The reducer is hoisted until the axis of the reducer coincides with the axis of the second joint member, and an output shaft of the reducer is fixed to the second joint member, and an input shaft of the reducer can be fixed to the first joint member. Consequently, the second joint member and the reducer can be separately hoisted to be assembled by the single crane.

In the above aspect, the second joint member may include a fitting surface capable of fitting a surface to be fitted of the reducer in the direction along the axis in a state in which the flange surfaces are closely adhered to each other.

This configuration is employed, so that when the input shaft of the reducer is fixed to the first joint member, in a state in which the surface to be fitted of the reducer is fitted to the fitting surface, the second joint member is suspended again by the crane, and then the bolt that closely adheres the flange surfaces can be detached.

As the input shaft of the reducer, and the first joint member are fastened by a bolt, the reducer fixed to the second joint member is moved in the direction of the axis with respect to the first joint member, and the fitting length of the surface to be fitted to the fitting surface is increased. Positioning of the input shaft of the reducer, and the first joint member is established by the deepening of the fitting, and the flange surfaces are separated to form a suitable gap between the first joint member and the second joint member.

In the above aspect, the fitting surface may include a cylindrical inner surface disposed coaxially with the axis.

This configuration is employed, so that the surface to be fitted of the reducer, composed of a cylindrical surface, is fitted to the fitting surface composed of a cylindrical inner surface disposed coaxially with the axis, and the reducer and the first joint member can be easily positioned coaxially.

According to the present invention, an effect capable of performing assembly work, maintenance work, or the like is obtained even under environment where only a single crane is provided.

REFERENCE SIGNS LIST 1 robot
2 joint
3 revolving drum (first joint member)
4 arm (second joint member)
5a through hole
7 bearing
8 reducer
27 fitting surface
30, 31 flange surface
32 screw hole
33 bolt
B horizontal axis (axis)

The invention claimed is:

1. A robot comprising one or more joints, wherein at least the one joint includes:
    a first joint member and a second joint member disposed so as to be relatively rotatable around a predetermined axis;
    a reducer that relatively rotatably supports the first joint member and the second joint member around the axis on one side in a direction of the axis of the first joint member; and
    a bearing that supports the first joint member and the second joint member relatively rotatably around the axis and relatively movably in a direction along the axis on another side in the direction of the axis of the first joint member,
the first joint member and the second joint member include respective flange surfaces perpendicular to the axis and facing each other in the direction of the axis, and each of the flange surfaces includes a screw hole or a through hole for closely adhering the flange surfaces by fastening of a bolt.

2. The robot according to claim 1, wherein the second joint member includes a fitting surface capable of fitting a surface to be fitted of the reducer in the direction along the axis in a state in which the flange surfaces are closely adhered to each other.

3. The robot according to claim 2, wherein the fitting surface comprises a cylindrical inner surface disposed coaxially with the axis.

* * * * *